(12) United States Patent
Kim et al.

(10) Patent No.: US 12,554,237 B2
(45) Date of Patent: Feb. 17, 2026

(54) ELECTRONIC APPARATUS AND CONTROL METHOD THEREOF

(71) Applicant: SAMSUNG ELECTRONICS CO., LTD., Suwon-si (KR)

(72) Inventors: Jooyoo Kim, Suwon-si (KR); Hyungseon Song, Suwon-si (KR); Kyungjae Kim, Suwon-si (KR); Jongyoub Ryu, Suwon-si (KR); Dongjun Shin, Suwon-si (KR); Miyoung Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 479 days.

(21) Appl. No.: 18/101,419

(22) Filed: Jan. 25, 2023

(65) Prior Publication Data

US 2023/0229128 A1 Jul. 20, 2023

Related U.S. Application Data

(63) Continuation of application No. PCT/KR2022/015626, filed on Oct. 14, 2022.

(30) Foreign Application Priority Data

Jan. 19, 2022 (KR) .................. 10-2022-0008108

(51) Int. Cl.
G05B 19/042 (2006.01)
(52) U.S. Cl.
CPC .... *G05B 19/042* (2013.01); *G05B 2219/2639* (2013.01)
(58) Field of Classification Search
CPC .................. G05B 19/042; G05B 2219/2639
See application file for complete search history.

(56) References Cited

U.S. PATENT DOCUMENTS 4,858,141 A * 8/1989 Hart .................. G01R 21/1331
340/657
9,093,833 B1 * 7/2015 Ellenbogen .............. H02H 3/00
(Continued)

FOREIGN PATENT DOCUMENTS

JP 2004-297854 A 10/2004
JP 2008-176519 A 7/2008
(Continued)

OTHER PUBLICATIONS

Search Report and Written Opinion (PCT/ISA/210, PCT/ISA/237 issued Jan. 20, 2023 by the International Searching Authority for International Patent Application No. PCT/KR2022/015626.

*Primary Examiner* — Kidest Worku
(74) *Attorney, Agent, or Firm* — Sughrue Mion, PLLC

(57) ABSTRACT

An electronic apparatus is disclosed. The electronic apparatus includes a memory stored with home device information corresponding respectively to a plurality of households and electrical power usage information corresponding respectively to the plurality of households, and a processor configured to control the electronic apparatus by being connected to the memory, and the processor is configured to obtain, based on a service request being received from a new household, home device information corresponding to the new household, update home device information corresponding to the new household based on at least one device included in the obtained home device information, identify at least one household from among the plurality of households based on the updated home device information, and obtain predicted electrical power usage information of the new household based on electrical power usage information corresponding to the identified at least one household.

15 Claims, 14 Drawing Sheets

(56) References Cited

U.S. PATENT DOCUMENTS

| | | | |
|---|---|---|---|
| 10,491,001 B2 | 11/2019 | Lim et al. | |
| 2005/0043862 A1* | 2/2005 | Brickfield | H02J 3/003 |
| | | | 700/295 |
| 2011/0112780 A1* | 5/2011 | Moss | H02J 13/00026 |
| | | | 702/62 |
| 2015/0236913 A1* | 8/2015 | Nakano | H04L 67/10 |
| | | | 709/223 |
| 2015/0317705 A1* | 11/2015 | Inoue | G06Q 10/00 |
| | | | 705/34 |
| 2016/0300147 A1* | 10/2016 | Kim | H04L 12/2803 |
| 2018/0183238 A1 | 6/2018 | Lim et al. | |
| 2019/0122132 A1* | 4/2019 | Rimini | G06Q 50/06 |

FOREIGN PATENT DOCUMENTS

| | | |
|---|---|---|
| JP | 2012-48409 A | 3/2012 |
| JP | 2016-45590 A | 4/2016 |
| JP | 2016-85497 A | 5/2016 |
| JP | 5938083 B2 | 6/2016 |
| JP | 2016-158369 A | 9/2016 |
| JP | 2017-17777 A | 1/2017 |
| JP | 2017017776 A * | 1/2017 |
| JP | 2017-120519 A | 7/2017 |
| KR | 10-1336162 B1 | 12/2013 |
| KR | 10-2016-0140266 A | 12/2016 |
| KR | 10-1696996 B1 | 1/2017 |
| KR | 10-2017-0059808 A | 5/2017 |
| KR | 10-1749693 B1 | 7/2017 |

\* cited by examiner

FIG. 12

| OUTPUT DATA | | | INPUT DATA | | | | | | | | | | |
|---|---|---|---|---|---|---|---|---|---|---|---|---|---|
| HOUSEHOLD A' | | HOUSEHOLD B | | | | | ... | HOUSEHOLD Ze | | | | | |
| HOUSEHOLD ELECTRICAL POWER AMOUNT | HOME DEVICE INFORMATION OF HOUSEHOLD A' | HOUSEHOLD ELECTRICAL POWER AMOUNT | TOTAL NUMBER OF HOME APPLIANCES | A | B | C | ... | HOUSEHOLD ELECTRICAL POWER AMOUNT | TOTAL NUMBER OF HOME APPLIANCES | A | B | C | D | E | F |
| 200 | ACD | 250 | 3 | 1 | 1 | 1 | ... | 380 | 7 | 1 | 1 | 1 | 1 | 1 | 1 |
| ⋮ | | | | | | | | ⋮ | | | | | | | |

FIG. 13

| OUTPUT DATA | INPUT DATA | | | | | | | | | | |
|---|---|---|---|---|---|---|---|---|---|---|---|
| HOUSEHOLD A' | | | | | | | | | | | |
| HOUSEHOLD ELECTRICAL POWER AMOUNT | HOME DEVICE INFORMATION OF HOUSEHOLD A' | HOUSEHOLD INFORMATION | HOUSEHOLD ELECTRICAL POWER USAGE | TOTAL NUMBER OF HOME APPLIANCES | A | B | C | D | E | F | G |
| 200 | ACD | HOUSEHOLD B | 250 | | 1 | 1 | 1 | 0 | 0 | 0 | 0 |
| 200 | ACD | HOUSEHOLD C | 270 | 5 | 1 | 1 | 1 | 1 | 0 | 1 | 0 |
| 200 | ACD | HOUSEHOLD D | 380 | 7 | 1 | 1 | 1 | 1 | 1 | 1 | 1 |
| .. | | | | | | | | | | | |

ELECTRONIC APPARATUS AND CONTROL METHOD THEREOF

CROSS-REFERENCES TO RELATED APPLICATIONS

This application is a bypass continuation of International Application No. PCT/KR2022/015626, filed on Oct. 14, 2022, in the Korean Intellectual Property Office, which is based on and claims priority to Korean Patent Application No. 10-2022-0008108, filed on Jan. 19, 2022, in the Korean Intellectual Property Office, the disclosures of which are incorporated by reference herein in their entireties.

BACKGROUND

1. Field

The disclosure relates to an electronic apparatus and a control method thereof, and more particularly, to an electronic apparatus which predicts an electrical power usage of a household and a control method thereof.

2. Description of Related Art

Electronic apparatuses of various types are under development with advances in electronic technology. Recently, with the distribution of Internet of Things (IoT), various devices may be remote controlled and thereby incurring an increase in electrical power consumption.

To solve this problem, a household energy usage predicting service which predicts future energy to be used in a household with past energy usages of the household has been developed. In addition, in case a predicted value of energy used in the household exceeds an energy target value of the household pre-set by a user, a home energy reducing service, which provides energy reduction commands for home appliances in the household so as to not exceed the target value, has also been developed.

However, when a new household applies for the service described above, there is the problem of not being able to predict energy usage because there is no past energy usage information of the new household. In addition, because predicting energy usage is not possible, there is the problem of not being able to compare with a target value and thereby not being able to prevent an increase in energy consumption because of no energy reduction command is provided.

Accordingly, there is a need for a method to be developed to resolve the problems described above.

SUMMARY

The disclosure addresses the needs described above, and an aspect of the disclosure is to provide an electronic apparatus which predicts an electrical power usage of a household that newly applied for service and has no electrical power usage information and a control method thereof.

According to an embodiment, an electronic apparatus includes a memory stored with home device information corresponding respectively to a plurality of households and electrical power usage information corresponding respectively to the plurality of households, and a processor configured to control the electronic apparatus by being connected to the memory, and the processor is configured to obtain, based on a service request being received from a new household, home device information corresponding to the new household, update home device information corresponding to the new household based on at least one device included in the obtained home device information, identify at least one household from among the plurality of households based on the updated home device information, and obtain predicted electrical power usage information of the new household based on electrical power usage information corresponding to the identified at least one household.

The processor is configured to update, based on a first device being in at least one device in the home device information, the home device information by removing the first device from the home device information, and update, based on a second device being in at least one device in the home device information, the home device information by adding a third device corresponding to the second device to the home device information.

The first device includes a device released after a pre-set time point, and the second device includes at least one from among a device of a pre-set type or a device of a pre-set model name.

The processor is configured to identify the at least one household including at least one device in the updated home device information from among the plurality of households.

The processor is configured to update electrical power usage information corresponding respectively to the identified at least one household by applying a correction ratio to electrical power usage information corresponding respectively to the identified at least one household; and obtain the predicted electrical power usage information based on the updated electrical power usage information.

The processor is configured to apply a correction ratio of 1 to a first household which includes a device corresponding to at least one device in the updated home device information from among the identified at least one household, and apply a correction ratio of less than 1 to a second household which includes a device corresponding to at least one device in the updated home device information and an additional device from among the identified at least one household, wherein the correction ratio of less than 1 is obtained based on a ratio of electrical power usage information of a device corresponding to at least one device in the updated home device information from the second household and electrical power usage information of a device corresponding to at least one device in the updated home device information and a total of additional devices from the second household.

The memory is configured to further store a neural network model, and the processor is configured to obtain electrical power usage information corresponding respectively to the identified at least one household, electrical power usage information corresponding to at least one device in home device information of each of the identified at least one household, and the predicted electrical power usage information by inputting the updated home device information to the neural network model.

The processor is configured to perform weighted-summation of electrical power usage information corresponding to the identified at least one household, and obtain the predicted electrical power usage information based on the weighted-summed electrical power usage information.

The processor is configured to obtain predicted electrical power usage information of the identified at least one household based on electrical power usage information corresponding to the identified at least one household, and obtain predicted electrical power usage information of the new household by performing weighted-summation of predicted electrical power usage information of the identified at least one household.

The processor is configured to control, based on the predicted electrical power usage information exceeding a pre-set electrical power usage information, an operating state of at least one device in the home device information.

According to an embodiment, a control method of an electronic apparatus includes obtaining, based on a service request being received from a new household, home device information corresponding to the new household, updating home device information corresponding to the new household based on at least one device included in the obtained home device information, identifying at least one household from among a plurality of households based on the updated home device information, and obtaining predicted electrical power usage information of the new household based on electrical power usage information corresponding to the identified at least one household.

The updating includes updating, based on a first device being in at least one device in the home device information, the home device information by removing the first device from the home device information, and updating, based on a second device being in at least one device in the home device information, the home device information by adding a third device corresponding to the second device to the home device information.

The first device includes a device released after a pre-set time point, and the second device includes at least one from among a device of a pre-set type or a device of a pre-set model name.

The identifying includes identifying the at least one household comprising at least one device in the updated home device information from among the plurality of households.

The obtaining the predicted electrical power usage information includes updating electrical power usage information corresponding respectively to the identified at least one household by applying a correction ratio to electrical power usage information corresponding respectively to the identified at least one household, and obtaining the predicted electrical power usage information based on the updated electrical power usage information.

According to the various embodiments of the disclosure as described above, the electronic device may provide, by predicting the electrical power usage of the new household by using the electrical power usage information of another household, a user convenience for the new household despite there being no past electrical power usage information.

In addition, the electronic apparatus may have an effect of reducing the electrical power consumption by controlling an operating state of at least one device disposed in the new household based on the predicted electrical power usage exceeding a threshold value.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 and FIG. 13 are diagrams illustrating a neural network model according to various embodiments.

DETAILED DESCRIPTION

Figure 1:
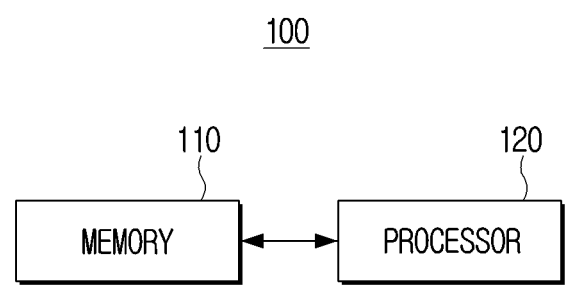
FIG. 1 is a diagram illustrating a configuration of an electronic apparatus according to an embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The disclosure will be described in detail below with reference to the accompanying drawings.

Terms used in the embodiments of the disclosure are general terms selected that are currently widely used considering their function herein. However, the terms may change depending on intention, legal or technical interpretation, emergence of new technologies, and the like of those skilled in the related art. In addition, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the description, the term "A or B", "at least one of A or B", "at least one of A and B", or "one or more of A or/and B" may include all possible combinations of the items that are enumerated together. For example, the term "A or B" or "at least one of A or/and B" may designate (1) only A, (2) only B, or (3) both A and B.

The expressions such as "first," "second," "1st," or "2nd" used herein may be used to refer to various elements, regardless of order and/or importance, and it should be noted that the expressions are merely used to distinguish an element from another element and not to limit the relevant elements.

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using a drying device or a device (e.g., artificial intelligence device) using a drying device.

An embodiment of the disclosure will be described in greater detail below with reference to the accompanied drawings.

FIG. 1 is a diagram illustrating a configuration of an electronic apparatus 100 according to an embodiment.

The electronic apparatus 100 may be an apparatus for obtaining predicted electrical power usage information, and may be a server, a television (TV), a desktop personal computer (PC), a notebook, a set top box (STB), a smartphone, a tablet PC, or the like. Specifically, the electronic apparatus 100 may obtain the predicted electrical power usage information of a new household which requested service. However, the embodiment is not limited thereto, and the electronic apparatus 100 may be any apparatus as long as it is an apparatus capable of obtaining the predicted electrical power usage information.

Here, the electrical power usage may be an electrical power usage which is notified from an electrical power company. Alternatively, the electrical power usage may be a total electrical power usage of a household measured during a specific period through a smart meter. Alternatively, the electrical power usage may be an incremented electrical power usage during a specific period from an accumulated electrical power usage of a household.

Referring to FIG. 1, the electronic apparatus 100 may include a memory 110 and a processor 120.

In the memory 110, at least one instruction or module necessary in an operation of the electronic apparatus 100 or the processor 120 may be stored. Here, the instruction may be a code unit instructing an operation of the electronic apparatus 100 or the processor 120, and may be prepared in a machine language which is a language understood by a computer. The module may be a series of instruction sets performing a specific task of a task unit.

In addition, the memory 110 may be stored with data which is information in a bit or a byte unit capable of representing a character, a number, an image, or the like. For example, the memory 110 may be stored with home device information corresponding to each of a plurality of households and electrical power usage information corresponding to the respective households. For example, the memory 110 may be stored with home device information of a first household using a TV and an air conditioner. Here, the home device information may include information on a product name, a model name, a manufacturer, electrical power consumption, and the like of respective devices. In addition, the memory 110 may be stored with information that the TV of the first household used an electrical power of 35 kWh, and the air conditioner of the first household used an electrical power of 87 kWh.

In addition, electrical power usage information corresponding to the respective households may be stored in the memory 110 in pre-set time intervals. For example, the memory 110 may be stored with electrical power usage information for each month. Here, the electrical power usage information for each month may include past electrical power usage information for each month and current month electrical power usage information in real-time. That is, the electronic apparatus 100 may receive the electrical power usage information of the respective devices from the plurality of households in real-time. However, the embodiment is not limited thereto, and the electronic apparatus 100 may also receive the electrical power usage information of the respective devices from the plurality of households at pre-set time intervals.

In addition, the memory 110 may be stored with an area of the respective households, an arrangement position of the respective devices, and the like.

In addition, the memory 110 may be stored with at least one neural network model to obtain the predicted electrical power usage information.

The memory 110 may be accessed by the processor 120, and reading/writing/modifying/deleting/updating and the like of an instruction, a module, a neural network model, or data may be performed by the processor 120.

The processor 120 may be configured to control the overall operation of the electronic apparatus 100. Specifically, the processor 120 may be configured to control the overall operation of the electronic apparatus 100 by being connected with each configuration of the electronic apparatus 100. For example, the processor 120 may be configured to control an operation of the electronic apparatus 100 by being connected with configurations such as, for example, and without limitation, the memory 110, a display, a communication interface, a user interface, and the like.

According to an embodiment, the processor 120 may be implemented as a digital signal processor (DSP), a microprocessor, and a time controller (TCON). However, the embodiment is not limited thereto, and may include one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SoC) or a large scale integration (LSI) in which a processing algorithm is embedded, and may be implemented in the form of a field programmable gate array (FPGA).

The processor 120 may be configured to obtain home device information corresponding to a new household when a service request is received from the new household. For example, the processor 120 may be configured to obtain home device information that a TV, a refrigerator, an air conditioner, and a washer are installed in a new household when the service request is received from the new household. The home device information as described above may be in a state stored in the memory 110, and the processor 120 may be configured to read the home device information corresponding to the new household from the memory 110 when the service request is received from the new household. Alternatively, a user of a new household may simultaneously perform the service request and an input of home device information, and in this case, the processor 120 may be configured to obtain the home device information with the service request from the new household.

The processor 120 may be configured to update the home device information corresponding to the new household based on at least one device included in the obtained home device information. For example, the processor 120 may be configured to update, based on a first device being included in at least one device included in the home device information, the home device information by removing the first device from the home device information. Here, the first device may include a device released after a pre-set time point. For example, the processor 120 may be configured to update, based on at least one device included in the obtained home device information being a new product such as a shoe dresser, the home device information by deleting the shoe dresser.

Alternatively, the processor 120 may be configured to update, based on a second device being included in at least one device included in the home device information, the home device information by adding a third device corresponding to the second device in the home device information. Here, the second device may include at least one from among a device of a pre-set type or a device of a pre-set model name. For example, the processor 120 may be configured to update, based on at least one device included in the obtained home device information being a washer, the home device information by adding a dryer. Alternatively, the processor 120 may be configured to update, based on at least one device included in the obtained home device information being a stand air conditioner, and a model name of the air conditioner being a model name corresponding to a 2in1 air conditioner (stand+wall mounted air conditioner), the home device information by adding a wall-mounted air conditioner.

An update of the home device information may be performed automatically, but the update may be performed only when there is a user consent.

The processor 120 may be configured to identify at least one household from among the plurality of households based on the updated home device information. For example, the processor 120 may be configured to identify at least one household including at least one device which is included in the updated home device information from among the plurality of households. For example, the processor 120 may be configured to identify, based on the updated home device information including a TV and a refrigerator, an A household including a TV and a refrigerator and a B household including a TV, a refrigerator, and a washer from among the plurality of households.

The processor 120 may be configured to obtain the predicted electrical power usage information of the new household based on the electrical power usage information corresponding to the identified at least one household. In the above-described example, the processor 120 may be configured to obtain the predicted electrical power usage information of the new household based on the electrical power usage information of the A household and the B household.

The processor 120 may be configured to update the electrical power usage information corresponding respectively to the identified at least one household by applying a correction ratio to the electrical power usage information corresponding respectively to the identified at least one household, and obtain the predicted electrical power usage information based on the updated electrical power usage information.

For example, the processor 120 may be configured to apply a correction ratio of 1 to a first household which includes a device corresponding to at least one device included in the updated home device information from among the identified at least one household, and apply a correction ratio of less than 1 to a second household which includes a device corresponding to at least one device included in the updated home device information and an additional device from among the identified at least one household. Here, the correction ratio of less than 1 may be obtained based on a ratio of the electrical power usage information of a device corresponding to at least one device included in the updated home device information from the second household and the electrical power usage information of a device corresponding to at least one device included in the updated home device information and a total of additional devices from the second household. Specifically, by using the correction ratio of less than 1, the predicted electrical power usage information of the new household may be obtained by further using the second household which includes the additional device.

Alternatively, the memory 110 may be configured to further store the neural network model, and the processor 120 may be configured to obtain the electrical power usage information corresponding respectively to the identified at least one household, the electrical power usage information corresponding to at least one device included in the home device information of each of the identified at least one household, and the predicted electrical power usage information by inputting the updated home device information to the neural network model.

A function associated with the neural network model according to the embodiments of the disclosure may be operated through the processor 120 and the memory 110.

The processor 120 may be configured with one or a plurality of processors. The one or plurality of processors may be a generic-purpose processor such as the CPU, the AP, and the DSP, a graphics dedicated processor such as a graphics processing unit (GPU) and a vision processing unit (VPU), or an artificial intelligence dedicated processor such as a neural processing unit (NPU).

The one or plurality of processors may control for input data to be processed according to a pre-defined operation rule or a neural network model stored in the memory 110. Alternatively, if the one or plurality of processors is the artificial intelligence dedicated processor, the artificial intelligence dedicated processor may be designed to a hardware structure specializing in the processing of a specific neural network model. The pre-defined operation rule or the neural network model is characterized by being created through learning.

Here, the being created through learning may mean that the pre-defined operation rule or the neural network model set to perform a desired feature (or, purpose) is created as a basic artificial intelligence model is trained, by a learning algorithm, using multiple learning data. The learning may be carried out from a device itself in which the artificial intelligence according to the embodiments of the disclosure is performed, or carried out through a separate server and/or a system. Examples of the learning algorithm may include supervised learning, unsupervised learning, semi-supervised learning, or reinforcement learning, but is not limited to the above-described examples.

The neural network model may be configured with a plurality of neural network layers. The respective neural network layers may include a plurality of weight values, and may perform neural network processing through processing between the processing results of a previous layer and the plurality of weight values. The plurality of weight values comprised by the plurality of neural network layers may be optimized by the learning result of the neural network model. For example, the plurality of weight values may be updated for a loss value or a cost value obtained by the neural network model during the learning process to be reduced or minimized.

An artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Network (GAN), a Deep-Q Networks, or the like, but is not limited thereto.

The processor 120 may be configured to perform weighted-summation of the electrical power usage information corresponding to the identified at least one household, and obtain the predicted electrical power usage information based on the weighted-summed electrical power usage information.

Alternatively, the processor 120 may be configured to obtain the predicted electrical power usage information of the identified at least one household based on the electrical power usage information corresponding to the identified at least one household, and obtain the predicted electrical power usage information of the new household by performing weighted-summation of the predicted electrical power usage information of the identified at least one household.

The processor 120 may be configured to predict the electrical power usage of a future time point through various methods. For example, the processor 120 may be configured to predict the electrical power usage of a future time point based on a past data trend. However, the embodiment is not limited thereto, and methods of predicting the electrical power usage of a future time point may be varied.

The processor 120 may be configured to control an operating state of at least one device included in the home device information based on the predicted electrical power usage information exceeding a pre-set electrical power usage information. For example, the processor 120 may be configured to reduce, based on the predicted electrical power usage information exceeding the pre-set electrical power usage information, the electrical power consumption by turning-off at least one device included in the home device information after a pre-set time point. Alternatively, the processor 120 may be configured to reduce, based on the predicted electrical power usage information exceeding the pre-set electrical power usage information, the electrical power consumption by interrupting a standby electrical power.

Figure 2:
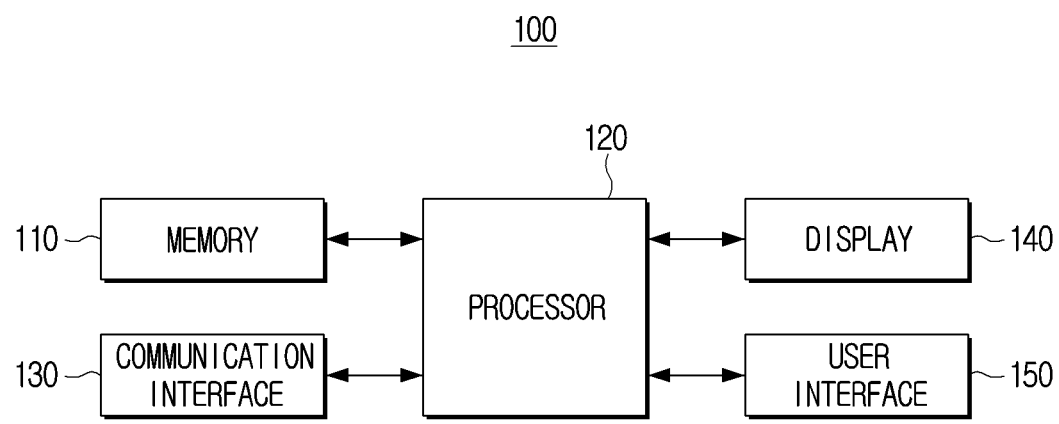
FIG. 2 is a diagram illustrating a detailed configuration of an electronic apparatus according to an embodiment.

FIG. 2 is a diagram illustrating a detailed configuration of the electronic apparatus 100 according to an embodiment. The electronic apparatus 100 may include the memory 110 and the processor 120. In addition, referring to FIG. 2, the electronic apparatus may further include a communication interface 130, a display 140, and a user interface 150. The detailed description of parts overlapping with the elements illustrated in FIG. 1 from among the elements illustrated in FIG. 2 will be omitted.

The communication interface 130 may be a configuration configured to perform communication with external devices of various types according to communication methods of various types. For example, the electronic apparatus 100 may obtain information on the respective households through the communication interface 130. Here, the information of the respective households may include home device information of the respective households, electrical power usage, and the like.

The communication interface 130 may include a WiFi module, a Bluetooth module, an infrared communication module, a wireless communication module, and the like. Here, the respective communication modules may be implemented to at least one hardware chip form.

The WiFi module and the Bluetooth module may perform communication in a WiFi method and a Bluetooth method, respectively. When using the WiFi module or the Bluetooth module, various connection information such as a service set identifier (SSID) and a session key may first be transmitted and received, and various information may be may transmitted and received after communicatively connecting using the same. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip configured to perform communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like in addition to the above-described communication method.

Alternatively, the communication interface 130 may include a wired communication interface such as, for example, and without limitation, a High Definition Multimedia Interface (HDMI), a display port (DP), a Thunderbolt, a Universal Serial Bus (USB), a RGB, a D-SUB, a Digital Visual Interface (DVI), and the like.

Other communication interfaces 130 may include at least one from among the wired communication modules performing communication by using a Local Area Network (LAN) module, an Ethernet module, a pair cable, a coaxial cable, an optical fiber cable, or the like.

The display 140 may be implemented as a display of various forms such as, for example, and without limitation, a liquid crystal display (LCD), an organic light emitting diode (OLED) display, a plasma display panel (PDP), and the like. In the display 140, a driving circuit, which may be implemented in the form of an a-si thin film transistor (TFT), a low temperature poly silicon (LTPS) TFT, an organic TFT (OTFT), or the like, a backlight unit, and the like may be included. The display 140 may be implemented as a touch screen coupled with a touch sensor, a flexible display, a three-dimensional display (3D display), or the like.

The user interface 150 may be implemented as a button, a touch pad, a mouse, a keyboard, and the like, or implemented as a touch screen capable of performing a display function and an operation input function together therewith. Here, the button may be a button of various types such as, for example, and without limitation, a mechanical button formed at a random area of a front surface part, a side surface part, a rear surface part, or the like of an outer exterior of a main body of the electronic apparatus 100, a touch pad, a wheel, and the like.

Through the operation as described above, the electronic apparatus 100 may predict the electrical power usage of the new household by using the electrical power usage information of a different household, and reduce the electrical power consumption by controlling an operating state of at least one device disposed at the new household based on the predicted electrical power usage exceeding a threshold value.

An operation of the electronic apparatus 100 will be described in greater detail below through FIGS. 3 to 13. Specifically, in FIGS. 3 to 13, separate embodiments will be described for convenience of description. However, the separate embodiments of FIGS. 3 to 13 may be implemented to any combined state.

Figure 3:
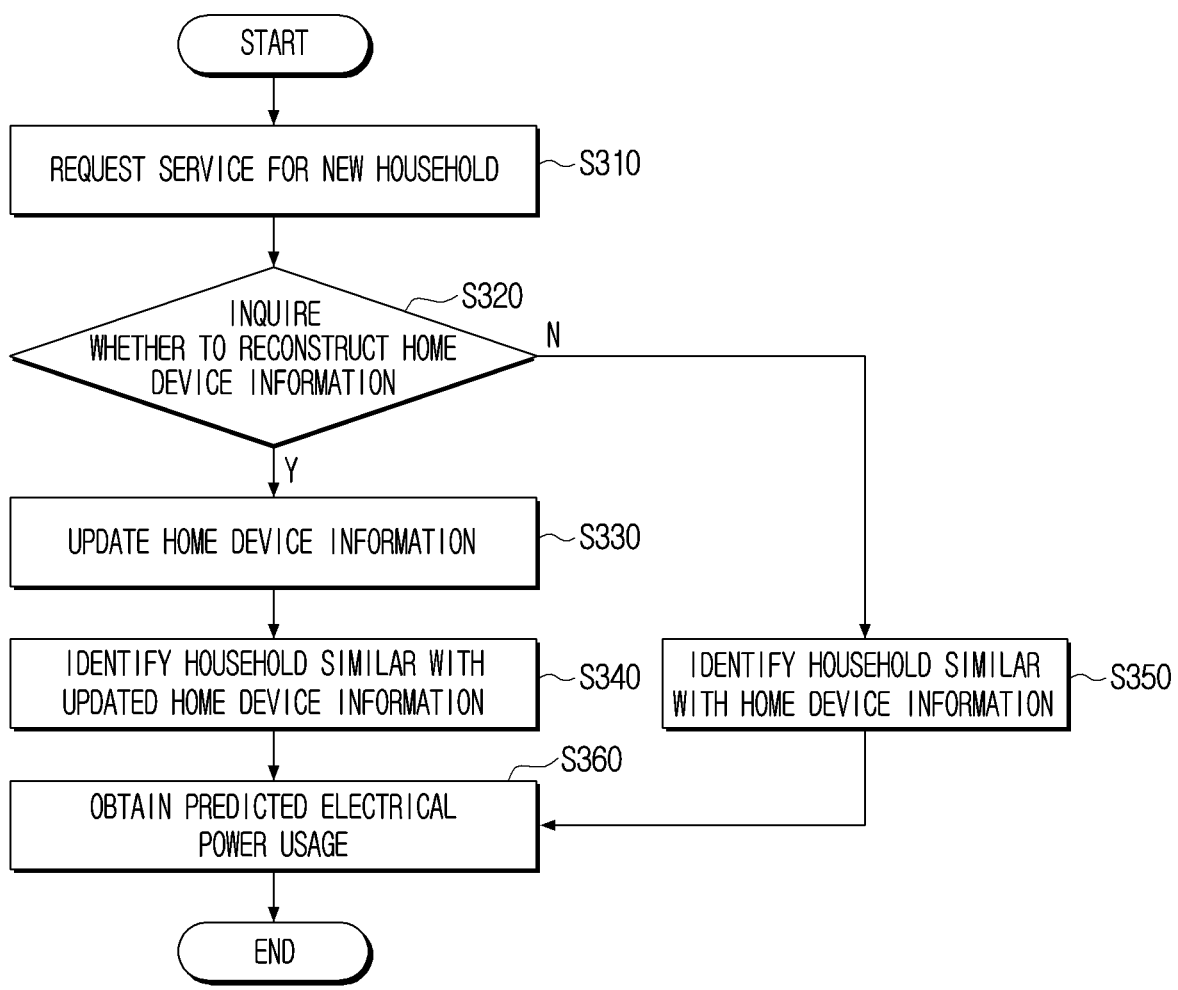
FIG. 3 is a flowchart illustrating an operation for obtaining a predicted electrical power usage according to an embodiment.

FIG. 3 is a flowchart illustrating an operation for obtaining the predicted electrical power usage according to an embodiment.

At operation S310, the processor 120 may be configured to receive a service request for the new household. For example, the processor 120 may be configured to receive the service request for the predicted electrical power usage from the new household. In this case, the processor 120 may be configured to identify whether it is an existing household, and based on the new household requesting the service, obtain the home device information of the new household. The processor 120 may be configured to request, based on obtaining of the home device information not being possible, the home device information to a device corresponding to the new household.

At operation S320, the processor 120 may be configured to inquire whether to reconstruct the home device information. For example, the processor 120 may be configured to inquire, based on at least one from among the first device or the second device being included in at least one device included in the home device information, whether to reconstruct the home device information to a device corresponding to the new household. Here, the first device may include a device released after the pre-set time point, and the second device may include at least one from among a device of a pre-set type or a device of a pre-set model name. That is, the processor 120 may be configured to identify when reconstruction is needed, and after inquiring whether to reconstruct the home device information to a device corresponding to the new household, update the home device information.

However, the embodiment is not limited thereto, and the processor 120 may be configured to update the home device information by removing the first device from the home device information based on the first device being included in at least one device included in the home device information, and update the home device information by adding the third device corresponding to the second device to the home device information based on the second device being included in at least one device included in the home device information. That is, the processor 120 may be configured to update the home device information without inquiring whether there is a reconstruction command to the user.

At operation S330, the processor 120 may be configured to update the home device information when the reconstruction command is received from the user based on inquiry, and not update the home device information when the reconstruction command is not received from the user.

At operation S340, the processor 120 may be configured to identify a household similar with the updated home device information when the home device information is updated. At operation S350, the processor may identify a household similar with the home device information when the home device information is not updated. Here, the processor 120 may be configured to identify the household similar with the home device information by greater than or equal to a pre-set number. For example, the processor 120 may be configured to identify, based on a number of households identified based on a first criterion being less than the pre-set number, the household similar with the home device information based on a second criterion which is a relaxation of the first criterion.

At operation S360, the processor 120 may be configured to obtain the predicted electrical power usage of the new household based on the identified household.

Figure 4:
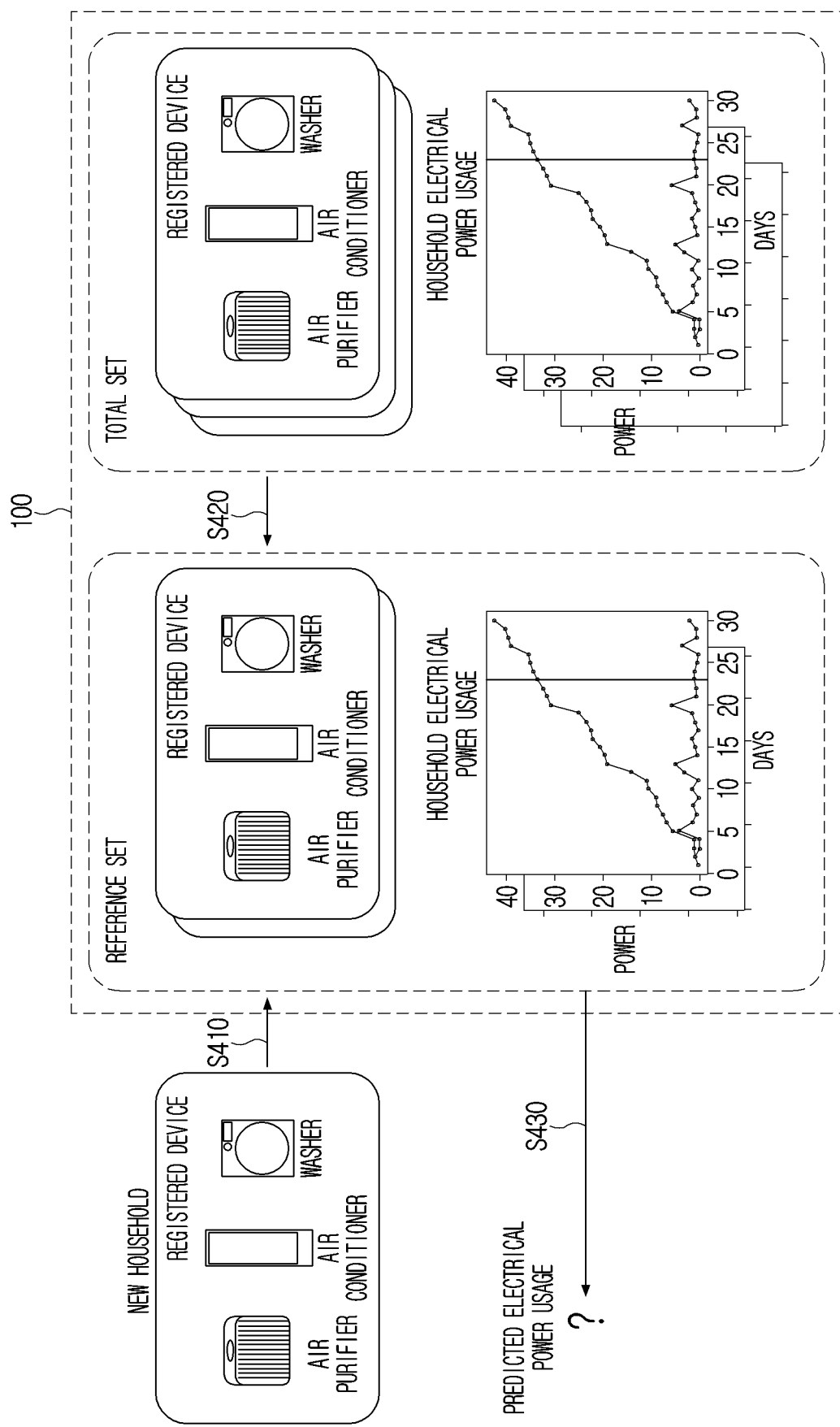
FIG. 4 is a diagram illustrating an overall order of a method for obtaining predicted electrical power usage information according to an embodiment.

FIG. 4 is a diagram illustrating an overall order of a method for obtaining predicted electrical power usage information according to an embodiment.

First, the home device information corresponding to respective households and the electrical power usage information corresponding to the respective households may be in a state stored in the electronic apparatus 100 as a total set. For example, the electronic apparatus 100 may provide a service predicting the electrical power usage, and the plurality of households may provide the home device information to the electronic apparatus 100 in a process of joining the service. The electronic apparatus 100 may receive the electrical power usage information from the plurality of households receiving the service. Here, the electronic apparatus 100 may classify and store the electrical power usage for each home device of the respective households.

The processor 120 may be configured to receive a service request signal together with the home device information from the new household (S410). The electronic apparatus 100 may be in a state in which the past electrical power usage information of the new household is not stored.

In this case, the processor 120 may be configured to identify a reference set from the total set based on the home device information of the new household (S420). The reference set may be a set of reference households identified from the total set to predict the electrical power usage of the new household. The home device of the reference household may the same as the home device of the new household or in a state which includes an additional device.

The processor 120 may be configured to output the predicted electrical power usage of the new household from the reference set (S430). Specifically, the processor 120 may be configured to output the predicted electrical power usage of the new household based on the electrical power usage information of the respective reference households included in the reference set.

The processor 120 may be configured to receive a target electrical power usage from the new household. The processor 120 may be configured to control an operating state of at least one device included in the home device information when the predicted electrical power usage of the new household exceeds the target electrical power usage. For example, the processor 120 may be configured to obtain the predicted electrical power usage at pre-set time intervals from a current time point to an end of a month, and identify whether the predicted electrical power usage until the end of the month exceeds the target electrical power usage. Then, the processor 120 may be configured to prevent, based on the predicted electrical power usage exceeding the target electrical power usage, unnecessary electrical power consumption of at least one device included in the home device information. For example, the processor 120 may be configured to interrupt the standby electrical power of a pre-set time slot. Alternatively, the processor 120 may be configured to lower a set temperature of the air conditioner, or a brightness of the TV. In this case, the processor 120 may be configured to first obtain the user consent, and then control the operating state of a device.

Figure 5:
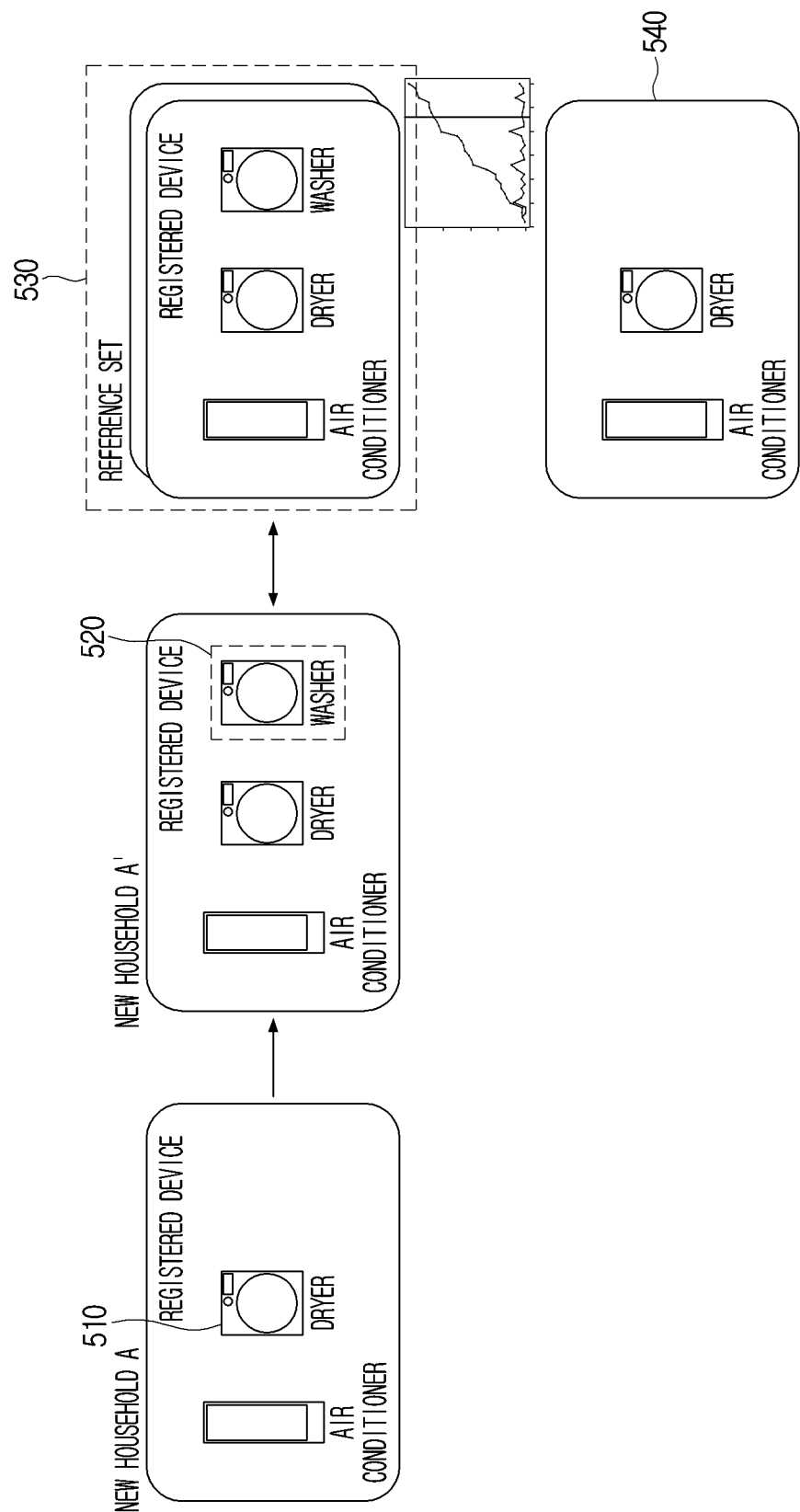
FIG. 5 is a diagram illustrating a method of updating home device information according to an embodiment.

FIG. 5 is a diagram illustrating a method of updating home device information according to an embodiment.

The processor 120 may be configured to update, based on the second device being included in at least one device included in the home device information, the home device information by adding the third device corresponding to the second device to the home device information. Here, the second device may include at least one from among the device of the pre-set type or the device of the pre-set model name.

For example, as illustrated in FIG. 5, based on a dryer 510 being included in at least one device included in the home device information, the processor 120 may be configured to update the home device information by adding a washer 520 corresponding to the dryer 510 to the home device information. Then, the processor 120 may be configured to add the household including the home devices as in 530 as the reference set based on the updated home device information, and not add the household including the home devices as in 540 as the reference set. This is because there is a high likelihood of the household with the dryer 510 also having the washer 520.

Alternatively, the processor 120 may be configured to update, based on the wall-mounted air conditioner being included in at least one device included in the home device information and a model name of the wall-mounted air conditioner being a model name corresponding to the 2in1 air conditioner, the home device information by adding the stand air conditioner of the same model name to the home device information. Alternatively, the processor 120 may be configured to update, based on the stand air conditioner being included in at least one device included in the home device information and a model name of the stand air conditioner being a model name corresponding to the 2in1 air conditioner, the home device information by adding the wall-mounted air conditioner of the same model name to the home device information.

The processor 120 may be configured to transmit, based on updating the home device information, a signal inquiring whether to allow an update to a user terminal corresponding to the new household. The processor 120 may be configured to update the home device information when the signal allowing the update is received from the user terminal.

Figure 6:
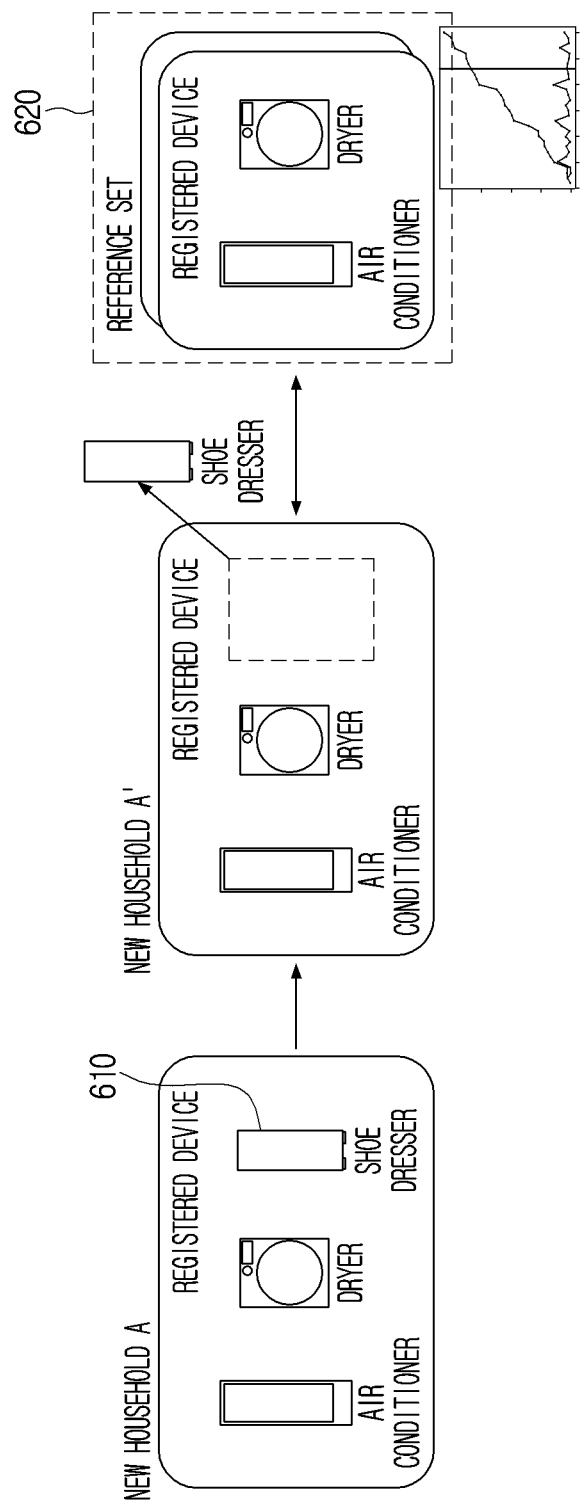
FIG. 6 is a diagram illustrating a method for updating home device information according to another embodiment.

FIG. 6 is a diagram illustrating a method for updating home device information according to another embodiment.

The processor 120 may be configured to update, based on the first device being included in at least one device included in the home device information, the home device information by removing the first device from the home device information. Here, the first device may include a device released after the pre-set time point.

For example, as illustrated in FIG. 6, the processor 120 may be configured to update, based on a new product such as a shoe dresser 610 being included in at least one device included in the home device information, the home device information by removing the shoe dresser 610 from the home device information. Then, the processor 120 may be configured to add the household including the home devices as in 620 as the reference set based on the updated home device information. That is, the processor 120 may be configured to use the home device information excluding the above because of a lack of electrical power consumption information of the new product.

The processor 120 may be configured to change the pre-set time point based on the current time point. For example, the processor 120 may be configured to identify from the current time point to a time point one-month prior to as a set time point.

The processor 120 may be configured to transmit, based on updating the home device information, the signal inquiring whether to allow the update to the user terminal corresponding to the new household. The processor 120 may be configured to update the home device information based on the signal allowing the update being received from the user terminal.

However, the embodiment is not limited thereto, and the processor 120 may be configured to also search households corresponding to the home device information without excluding the first device based on the first device being included in at least one device included in the home device information. The processor 120 may be configured to obtain, based on the households corresponding to the home device information being searched, the predicted electrical power usage information of the new household based on the searched households, update the home device information by removing the first device from the home device information based on the households corresponding to the home device information not being searched, and also search households based on the updated home device information.

Figure 7:
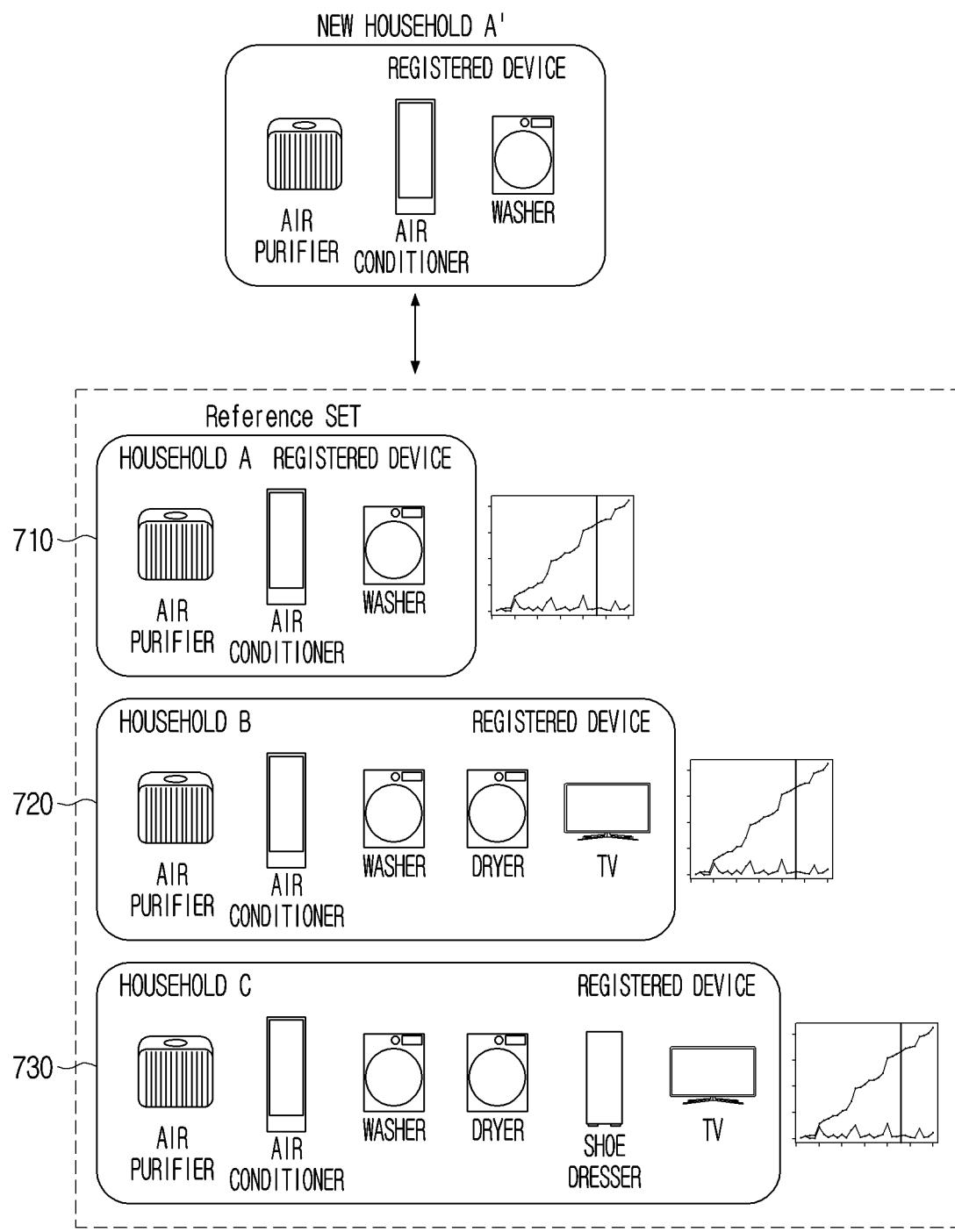
FIG. 7 is a diagram illustrating a method of identifying a reference household according to an embodiment.

FIG. 7 is a diagram illustrating a method of identifying the reference household according to an embodiment.

As illustrated in FIG. 7, the processor 120 may be configured to identify, based on the home device information of the new household including an air purifier, an air conditioner, and a washer, a household A 710 which includes the air purifier, the air conditioner, and the washer as the reference set. Then, the processor 120 may be configured to identify a household B 720 which further includes a dryer and a TV in addition to the air purifier, the air conditioner, and the washer and a household C 730 which further include a dryer, a shoe dresser, and a TV as the reference set.

However, the embodiment is not limited thereto, and the processor 120 may be configured to identify the household of the same home device information as with the home device information of the new household as a first reference set. The processor 120 may be configured to obtain, based on a number of the first reference set being greater than or equal to a pre-set first number, the predicted electrical power usage information of the new household based on the first reference set, identify the household included with an additional device in the home devices of the new household as a second reference set based on the number of the first reference set being less than the pre-set first number, and obtain the predicted electrical power usage information of the new household based on the first reference set and the second reference set.

According to an embodiment, the processor 120 may be configured to identify the household including the device with the same model name as with the home device of the new household as the reference set. The processor 120 may be configured to add, based on the number of identified households being less than a pre-set second number, a household including a device of the same model type as with the home device of the new household to the reference set. For example, the processor 120 may be configured to identify, based on the TV (a model name of SM75) being included in the home device information of the new household, the household including the model name SM75 as the reference set, obtain the predicted electrical power usage information based on the identified household based on the number of identified households being greater than or equal to the pre-set second number, add the household including the TV which is a product type and not the model name to the reference set based on the number of identified households being less than the pre-set second number, and obtain the predicted electrical power usage information by taking into further consideration the added household. Alternatively, the processor 120 may be configured to identify, based on the number of identified households being less than the pre-set second number, an additional household based on the product type and a rated electrical power consumption as the reference set.

According to an embodiment, the processor 120 may be configured to take into further consideration a location of the household based on a cooling and heating device being included in the home device information. For example, the processor 120 may be configured to identify, based on the air conditioner being included in the new household, a household within a pre-set distance from the location of the new household from among the households included with the air conditioner as the reference set.

The various embodiments of FIG. 7 described above may be implemented to any combined state.

Figure 8:
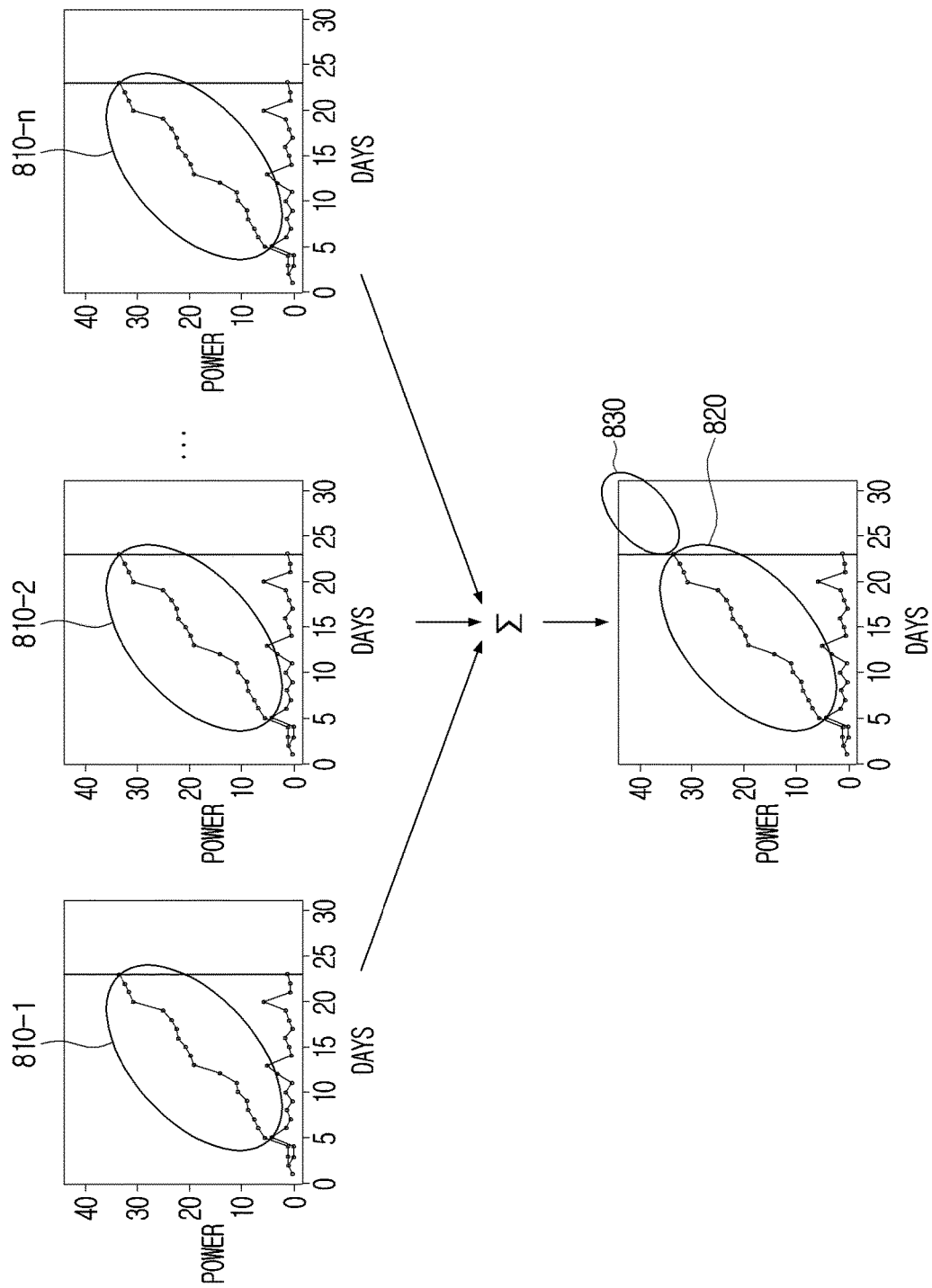
FIG. 8 is a diagram illustrating a method of predicting energy usage according to an embodiment.

FIG. 8 is a diagram illustrating a method of predicting energy usage according to an embodiment.

The processor 120 may be configured to perform weighted-summation of the electrical power usage information corresponding to the identified at least one household, and obtain the predicted electrical power usage information based on the weighted-summed electrical power usage information.

For example, as illustrated in FIG. 8, the processor 120 may be configured to perform weighted-summation of a plurality of electrical power usage information 810-1, 810-2, ... 810-$n$ corresponding to the plurality of households, and obtain the predicted electrical power usage information 830 based on the weighted-summed electrical power usage information 820.

However, the embodiment is not limited thereto, and the processor 120 may be configured to obtain the predicted electrical power usage information 830 in any other method. For example, the processor 120 may be configured to obtain a median value from among the plurality of electrical power usage information 810-1, 810-2, ... 810-$n$, and obtain the predicted electrical power usage information 830 based on the median value.

Figure 9:
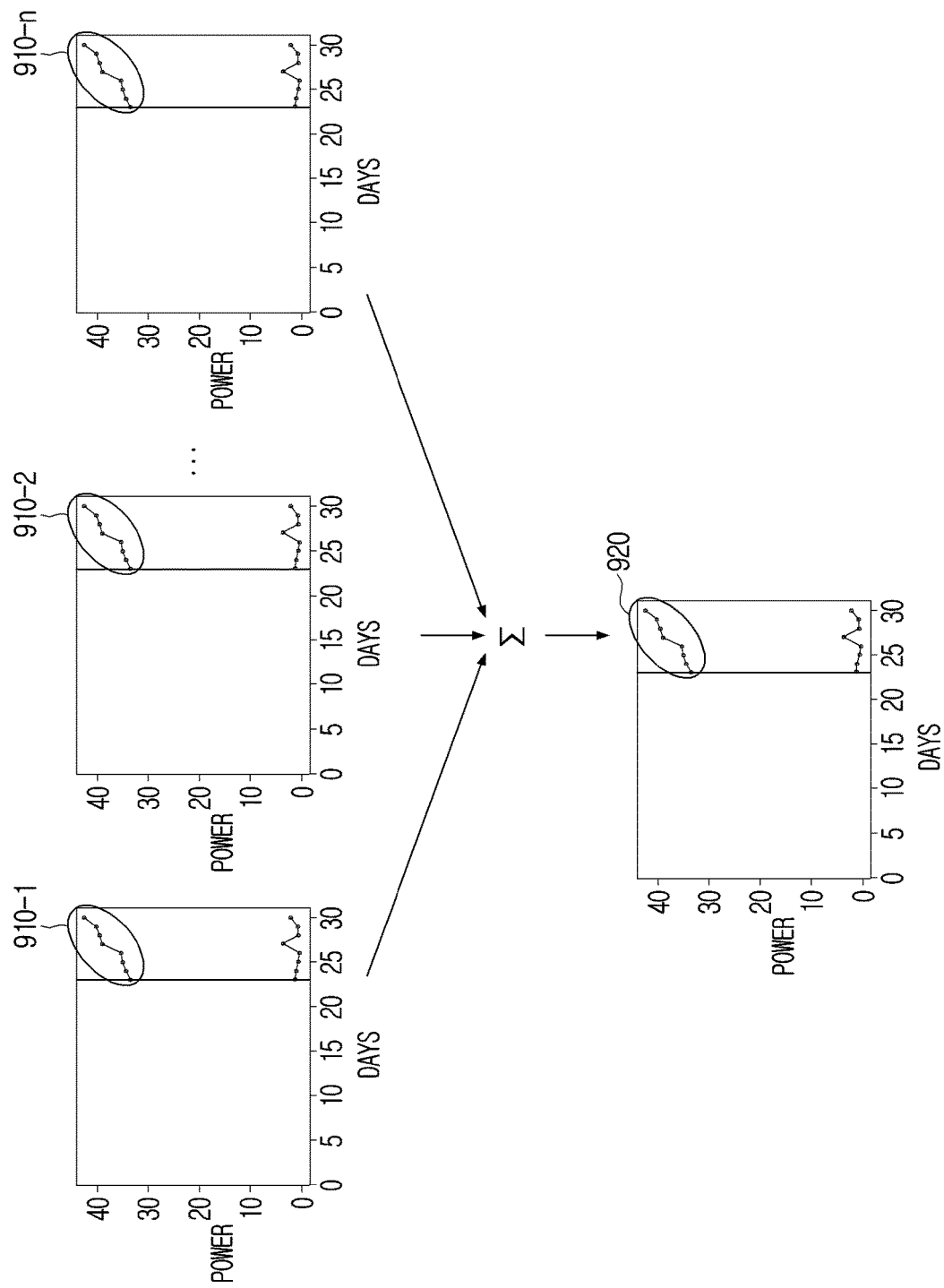
FIG. 9 is a diagram illustrating a method of predicting energy usage according to another embodiment.

FIG. 9 is a diagram illustrating a method of predicting energy usage according to another embodiment.

The processor 120 may be configured to obtain the predicted electrical power usage information of the identified at least one household based on the electrical power usage information corresponding to the identified at least one household, and obtain the predicted electrical power usage information of the new household by performing weighted-summation of the predicted electrical power usage information of the identified at least one household.

For example, as illustrated in FIG. 9, the processor 120 may be configured to obtain the predicted electrical power usage information 910-1, 910-2, ... 910-$n$ of the plurality of households based on the plurality of electrical power usage information corresponding to the plurality of households, and obtain the predicted electrical power usage information 920 of the new household by performing weighted-summation of the predicted electrical power usage information 910-1, 910-2, ... 910-$n$ of the plurality of households.

However, the embodiment is not limited thereto, and the processor 120 may be configured to obtain the predicted electrical power usage information 830 in any other method. For example, the processor 120 may be configured to obtain the predicted electrical power usage information 910-1, 910-2, ... 910-$n$ of the plurality of households based on the plurality of electrical power usage information, and obtain a median value from among the predicted electrical power usage information 910-1, 910-2, ... 910-$n$ of the plurality of households as the predicted electrical power usage information 920 of the new household.

Figure 10:
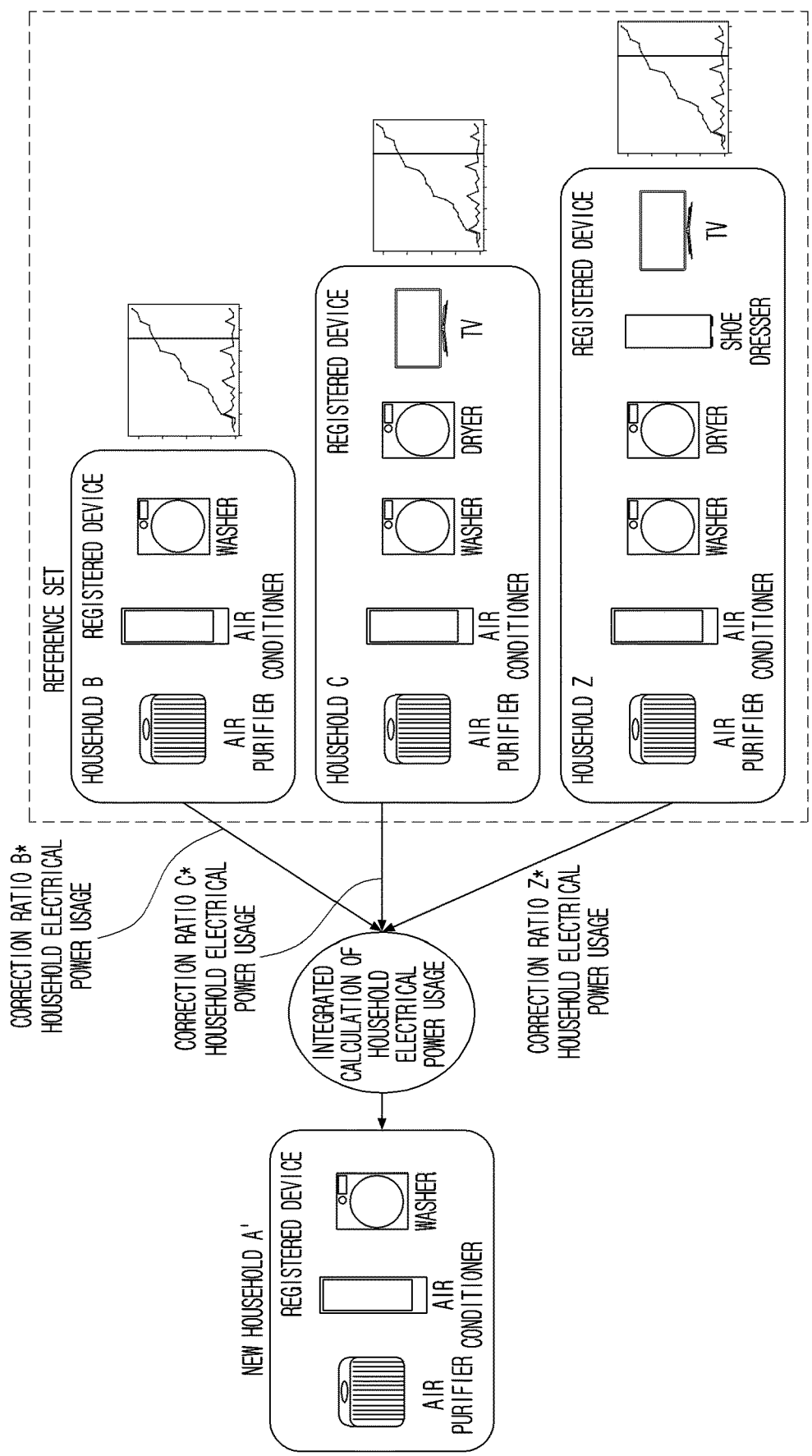
FIG. 10 is a diagram illustrating a method of applying a correction ratio according to an embodiment.

FIG. 10 is a diagram illustrating a method of applying a correction ratio according to an embodiment.

The processor 120 may be configured to update the electrical power usage information corresponding respectively to the identified at least one household by applying the correction ratio to the electrical power usage information corresponding respectively to the identified at least one household, and obtain the predicted electrical power usage information based on the updated electrical power usage information.

For example, as illustrated in FIG. 10, the processor 120 may be configured to apply a correction ratio B to the household B which includes a device corresponding to at least one device included in the updated home device information from among the identified at least one household, and respectively apply a correction ratio C and a correction ratio Z to a household C and a household Z which includes the device corresponding to at least one device included in the updated home device information from among the identified at least one household and the additional device. Here, the correction ratio B of the household B which does not include the additional device may be 1, and the correction ratio of less than 1 may be applied to the correction ratio C of the household C and the correction ratio Z of the household Z which includes the additional device. A method of obtaining the correction ratio of less than 1 will be described through FIG. 11.

Figure 11:
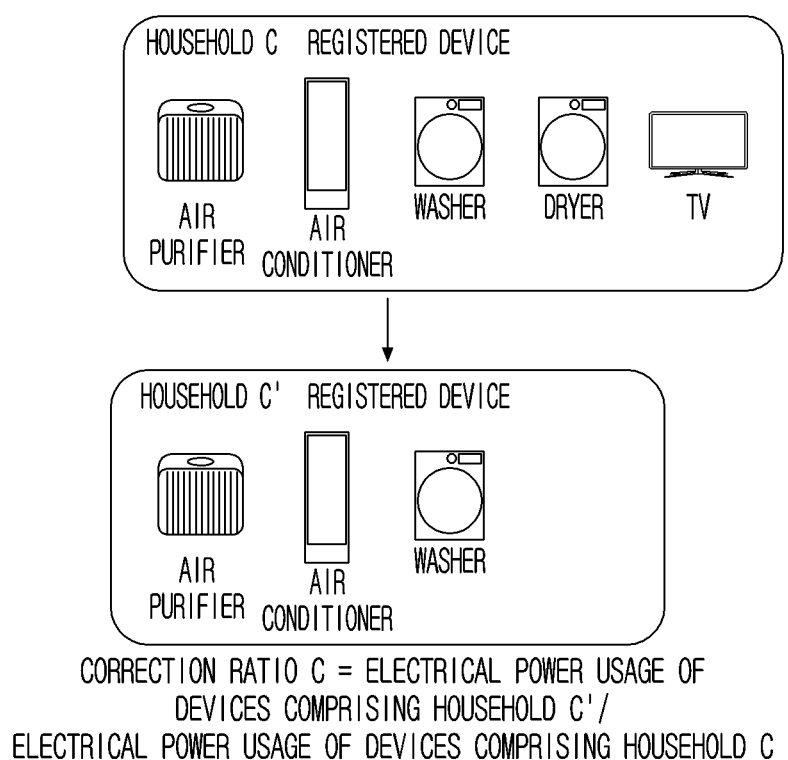
FIG. 11 is a diagram illustrating a correction ratio according to an embodiment.

FIG. 11 is a diagram illustrating a correction ratio according to an embodiment.

The processor 120 may be configured to obtain the correction ratio of less than 1 based on a ratio of the electrical power usage information of a device corresponding to at least one device included in the updated home device information from the household which includes the additional device and the electrical power usage information of a device corresponding to at least one device included in the updated home device information and the total of additional devices from the household which includes the additional device.

The processor 120 may be configured to obtain, as illustrated in FIG. 11, the correction ratio C based on a ratio of the electrical power usage information of the air purifier, the air conditioner and the washer in the household C and the electrical power usage information of the air purifier, the air conditioner, the washer, the dryer, and the TV in the household C.

A usage preference in the electrical power may be varied according to a number of device combinations and registered devices within the household, and obtaining the electrical power usage corrected with the usage preference may be obtained by using the correction ratio as described above.

FIG. 12 and FIG. 13 are diagrams illustrating a neural network model according to various embodiments.

The processor 120 may be configured to obtain the electrical power usage information corresponding respectively to the identified at least one household, the electrical power usage information corresponding to at least one device included in the home device information of each of the identified at least one household, and the predicted electrical power usage information by inputting the updated home device information to the neural network model.

For example, as illustrated in FIG. 12, input data may be home device information of a new household A' and device configurations and electrical power usage information of other households, output data may be an electrical power amount of the household A', and the neural network model may be a model which learned the through artificial intelligence a relationship of the input data and the output data.

Alternatively, as illustrated in FIG. 13, the input data may be home device information of the new household A' and device configurations and electrical power usage information of other households, the output data may be the electrical power amount of the household A', artificial intelligence learning of the relationship of the input data and the output data may be performed, and after learning one-time, an additional artificial intelligence learning may be performed by using the device configurations and the electrical power usage information of another household. The neural network model may be a model which repeatedly trained by a number of times in the artificial intelligence learning as described above.

Figure 14:
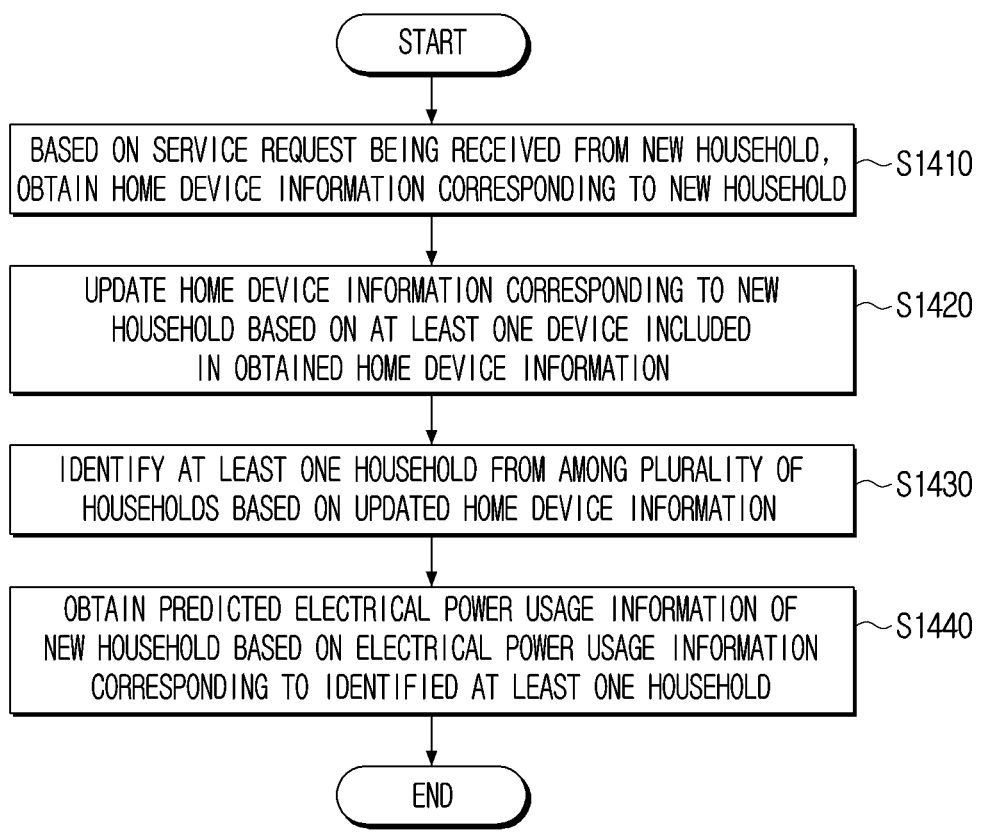
FIG. 14 is a flowchart illustrating a control method of an electronic apparatus according to an embodiment.

FIG. 14 is a flowchart illustrating a control method of an electronic apparatus according to an embodiment.

At operation S1410, based on a service request being received from a new household, the home device information corresponding to the new household may be obtained. At operation S1420, the home device information corresponding to the new household may be updated based on at least one device included in the obtained home device information. At operation S1430, the at least one household from among the plurality of households may be identified based on the updated home device information. At operation S1440, the predicted electrical power usage information of the new household may be obtained based on the electrical power usage information corresponding to the identified at least one household.

In addition, the updating operation S1420 may include updating, based on the first device being included in at least one device included in the home device information, the home device information by removing the first device from the home device information, and updating, based on the second device being included in at least one device included in the home device information, the home device information by adding the third device corresponding to the second device to the home device information.

Here, the first device may include a device released after the pre-set time point, and the second device may include at least one from among the device of the pre-set type or the device of the pre-set model name.

The identifying operation S1430 may include identifying the at least one household including at least one device included in the updated home device information from among the plurality of households.

At operation S1440, the obtaining the predicted electrical power usage information may include updating the electrical power usage information corresponding respectively to the identified at least one household by applying the correction ratio to the electrical power usage information corresponding respectively to the identified at least one household, and obtaining the predicted electrical power usage information based on the updated electrical power usage information.

In some embodiments, at operation S1440, the obtaining the predicted electrical power usage information may include applying the correction ratio of 1 to the first household which includes a device corresponding to at least one device included in the updated home device information from among the identified at least one household and applying the correction ratio of less than 1 to the second household which includes a device corresponding to at least one device included in the updated home device information and an additional device from among the identified at least one household, and the correction ratio of less than 1 may be obtained based on a ratio of the electrical power usage information of a device corresponding to at least one device included in the updated home device information from the second household and the electrical power usage information of a device corresponding to at least one device included in the updated home device information and the total of additional devices from the second household.

Operation S1440 may include obtaining the electrical power usage information corresponding respectively to the identified at least one household, the electrical power usage information corresponding to at least one device included in the home device information of each of the identified at least one household, and the predicted electrical power usage information by inputting the updated home device information to the neural network model.

In some embodiments, operation S1440 may include performing weighted-summation of the electrical power usage information corresponding to the identified at least one household, and obtaining the predicted electrical power usage information based on the weighted-summed electrical power usage information.

In some embodiments, operation S1440 may include obtaining the predicted electrical power usage information of the identified at least one household based on the electrical power usage information corresponding to the identified at least one household, and obtaining the predicted electrical power usage information of the new household by performing weighted-summation of the predicted electrical power usage information of the identified at least one household.

Then, based on the predicted electrical power usage information exceeding the pre-set electrical power usage information, controlling an operating state of at least one device included in the home device information may be further included.

According to the various embodiments of the disclosure as described above, the electronic device may provide, by predicting the electrical power usage of the new household by using the electrical power usage information of another household, a user convenience for the new household despite there being no past electrical power usage information.

In addition, the electronic apparatus may have an effect of reducing the electrical power consumption by controlling an operating state of at least one device disposed in the new household based on the predicted electrical power usage exceeding a threshold value.

According to an embodiment, the various embodiments described in the above may be implemented with software including instructions stored in a machine-readable storage media (e.g., computer). The machine may call an instruction stored in the storage medium, and as a device capable of operating according to the called instruction, may include a drying device (e.g., drying device (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a storage medium such as a server of a manufacturer, a server of an application store, or a memory of a relay server, or temporarily generated.

In addition, according to an embodiment, the various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

The computer instructions for performing processing operations of the devices according to the various embodiments described above may be stored in a non-transitory computer-readable medium. The computer instructions stored in this non-transitory computer-readable medium may cause a specific device to perform the processing operations in the device according to the above-described various embodiments when executed by the processor of the specific device. The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be configured as a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by the respective corresponding elements prior to integration. Operations performed by a module, a program, or other element, in accordance with various embodiments, may be executed sequentially, in parallel, repetitively, or in a heuristically manner, or at least some operations may be executed in a different order, omitted, or a different operation may be added.

While the disclosure has been illustrated and described with reference to example embodiments thereof, it will be understood that the example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:
   a memory storing home device information corresponding respectively to a plurality of households and electrical power usage information corresponding respectively to the plurality of households; and
   a processor configured to control the electronic apparatus by being connected to the memory,
   wherein the processor is configured to:
      obtain, based on a service request being received from a new household, the home device information corresponding to the new household,
      identify at least one household from among the plurality of households based on at least one device in the obtained home device information, and
      based on respective electrical power usage information corresponding to the identified at least one household and a respective correction ratio, obtain predicted electrical power usage information of the new household, wherein the respective correction ratio is based on the at least one device in the obtained home device information and a respective devices in the identified at least one household.

2. The electronic apparatus of claim 1, wherein the processor is further configured to:
   update, based on a first device being in the at least one device in the obtained home device information, the home device information to comprise home device information corresponding to the new household that the first device is removed from the obtained home device information, and
   update, based on a second device being in the at least one device in the home device information, the home device information to comprises home device information corresponding to the new household that a third device corresponding to the second device to the home device information.

3. The electronic apparatus of claim 2, wherein the first device comprises a device released after a pre-set time point, and
   the second device comprises at least one from among a device of a pre-set type or a device of a pre-set model name.

4. The electronic apparatus of claim 1, wherein the processor is further configured to:
   identify the at least one household comprising at least one device in the obtained home device information from among the plurality of households.

5. The electronic apparatus of claim 1, wherein the processor is further configured to:
   update the electrical power usage information corresponding respectively to the identified at least one household by applying the respective correction ratio to the electrical power usage information corresponding respectively to the identified at least one household; and
   obtain the predicted electrical power usage information based on the updated electrical power usage information.

6. The electronic apparatus of claim 5, wherein the processor is further configured to
   apply a correction ratio of 1 to a first household which comprises a device corresponding to at least one device in the obtained home device information from among the identified at least one household, and
   apply a correction ratio of less than 1 to a second household which comprises the device corresponding to the at least one device in the obtained home device information and an additional device from among the identified at least one household,
   wherein the correction ratio of less than 1 is obtained based on a ratio of electrical power usage information of a device corresponding to at least one device in the obtained home device information from the second household and an electrical power usage information of the device corresponding to the at least one device in the obtained home device information and a total of additional devices from the second household.

7. The electronic apparatus of claim 1, wherein the memory is configured to further store a neural network model, and
the processor is configured to obtain the electrical power usage information corresponding respectively to the identified at least one household, electrical power usage information corresponding to at least one device in the home device information of each of the identified at least one household, and the predicted electrical power usage information by inputting the obtained home device information to the neural network model.

8. The electronic apparatus of claim 1, wherein the processor is further configured to:
perform weighted-summation of the electrical power usage information corresponding to the identified at least one household, and
obtain the predicted electrical power usage information based on the weighted-summed electrical power usage information.

9. The electronic apparatus of claim 1, wherein the processor is further configured to:
obtain the predicted electrical power usage information of the identified at least one household based on the electrical power usage information corresponding to the identified at least one household, and
obtain the predicted electrical power usage information of the new household by performing weighted-summation of the predicted electrical power usage information of the identified at least one household.

10. The electronic apparatus of claim 1, wherein the processor is further configured to control, based on the predicted electrical power usage information exceeding a pre-set electrical power usage information, an operating state of at least one device in the home device information.

11. A control method of an electronic apparatus, the method being performed by at least one processor, and the method comprising:
obtaining, based on a service request being received from a new household, home device information corresponding to the new household;
identifying at least one household from among a plurality of households based on at least one device in the obtained home device information; and
based on respective electrical power usage information corresponding to the identified at least one household and a respective correction ratio, obtaining predicted electrical power usage information of the new household, wherein the respective correction ratio is based on the at least one device in the obtained home device information and a respective devices in the identified at least one household.

12. The control method of claim 11, further comprising:
updating, based on a first device being in at least one device in the obtained home device information, the home device information to comprise home device information corresponding to the new household that the first device is removed from the obtained home device information, and
updating, based on a second device being in at least one device in the home device information, the home device information to comprises home device information corresponding to the new household that a third device corresponding to the second device to the home device information.

13. The control method of claim 12, wherein the first device comprises a device released after a pre-set time point, and
the second device comprises at least one from among a device of a pre-set type or a device of a pre-set model name.

14. The control method of claim 11, wherein the identifying comprises identifying the at least one household comprising at least one device in the obtained home device information from among the plurality of households.

15. The control method of claim 11, wherein the obtaining the predicted electrical power usage information comprises:
updating the electrical power usage information corresponding respectively to the identified at least one household by applying the respective correction ratio to the electrical power usage information corresponding respectively to the identified at least one household, and
obtaining the predicted electrical power usage information based on the updated electrical power usage information.

* * * * *